US012218469B2

(12) United States Patent
Ito et al.

(10) Patent No.: US 12,218,469 B2
(45) Date of Patent: Feb. 4, 2025

(54) CRIMPING TERMINAL

(71) Applicant: Yazaki Corporation, Tokyo (JP)

(72) Inventors: Naoki Ito, Shizuoka (JP); Kazuma Watanabe, Shizuoka (JP); Michihiro Mori, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 389 days.

(21) Appl. No.: 17/858,136

(22) Filed: Jul. 6, 2022

(65) Prior Publication Data

US 2023/0008910 A1 Jan. 12, 2023

(30) Foreign Application Priority Data

Jul. 7, 2021 (JP) ................................ 2021-112472

(51) Int. Cl.

| | |
|---|---|
| ***H01R 4/00*** | (2006.01) |
| ***H01R 4/18*** | (2006.01) |
| ***H01R 4/26*** | (2006.01) |
| ***H01R 11/11*** | (2006.01) |

(52) U.S. Cl.

CPC ............... *H01R 4/185* (2013.01); *H01R 4/26* (2013.01); *H01R 11/11* (2013.01)

(58) Field of Classification Search

CPC ............ H01R 4/185; H01R 4/26; H01R 11/11
See application file for complete search history.

(56) References Cited

U.S. PATENT DOCUMENTS

| | | | | |
|---|---|---|---|---|
| 4,952,155 A * | 8/1990 | Kuzuno | H01R 31/08 439/189 |
| 5,837,413 A * | 11/1998 | Yada | G03G 9/09725 430/108.6 |
| 2023/0307178 A1* | 9/2023 | Matsuno | H01F 27/255 |
| 2024/0055938 A1* | 2/2024 | Yazaki | F02B 63/042 |
| 2024/0178584 A1* | 5/2024 | Watanabe | H01R 43/048 |
| 2024/0204611 A1* | 6/2024 | Ito | H02K 7/003 |

FOREIGN PATENT DOCUMENTS

| | | |
|---|---|---|
| JP | 2010-198789 A | 9/2010 |
| JP | 2010-244889 A | 10/2010 |

* cited by examiner

*Primary Examiner* — Phuong Chi Thi Nguyen
(74) *Attorney, Agent, or Firm* — Sughrue Mion, PLLC

(57) ABSTRACT

A crimping terminal includes a conductor crimping portion, the conductor crimping portion including: a bottom plate on which a conductor of an electric wire is disposed; and a pair of conductor tightening pieces extending from both side edges of the bottom plate, the conductor crimping portion configured to be crimped and connected to the conductor by tightening the conductor in a state where the conductor is covered with the conductor tightening pieces. The conductor crimping portion includes a serration extending in a groove shape across the pair of conductor tightening pieces and the bottom plate in a direction intersecting an extending direction of the conductor to be disposed on the bottom plate, and a width of an opening of the serration is equal to or larger than a width of a bottom surface of the serration.

4 Claims, 9 Drawing Sheets

CRIMPING TERMINAL

CROSS-REFERENCE TO RELATED APPLICATION(S)

The present application claims priority to and incorporates by reference the entire contents of Japanese Patent Application No. 2021-112472 filed in Japan on Jul. 7, 2021.

BACKGROUND OF THE INVENTION

1. Field of the Invention

The present invention relates to a crimping terminal.

2. Description of the Related Art

A typical crimping terminal crimped to an electric wire includes a conductor crimping portion that is tightened to be crimped to a conductor of the electric wire exposed at an end of the electric wire. The conductor crimping portion of the crimping terminal includes: a bottom plate; and plate-like conductor tightening pieces positioned on both sides of the bottom plate in a direction orthogonal to an extending direction of the electric wire and extending from the bottom plate, for example. By covering and tightening the electric wire disposed on the bottom plate with the conductor tightening pieces on both sides of the bottom plate, the conductor crimping portion is crimped and connected to the electric wire.

Moreover, some conventional crimping terminals have a serration formed on a contact surface of the crimping terminal, that is, a surface to come in contact with the conductor of an electric wire. For example, Japanese Patent Application Laid-open No. 2010-198789 and Japanese Patent Application Laid-open No. 2010-244889 disclose a crimping terminal in which serrations including a plurality of recessed grooves extending in a direction orthogonal to an extending direction of an electric wire are formed on a contact surface of a crimping terminal, that is a surface to come in contact with the conductor of the electric wire, thereby reducing a crimping portion resistance which is an electrical resistance at a crimping portion between the conductor of the electric wire and the crimping terminal.

Meanwhile, in the crimping terminal as described above, the serration exerts an effect of reducing the crimping portion resistance by using a configuration in which the conductor of the electric wire enters the groove of the serration due to the crimping force at the time of crimping the crimping terminal to the electric wire, and increases the contact area between the conductor and the crimping terminal. However, there is still room for further improvement in the configuration of the serration used for more stably reducing the crimp portion resistance.

SUMMARY OF THE INVENTION

The present invention has been made in view of the above, and aims to provide a crimping terminal capable of stably reducing the crimping portion resistance.

In order to achieve the above mentioned object, a crimping terminal according to one aspect of the present invention includes a conductor crimping portion that includes: a bottom plate on which a conductor of an electric wire is disposed; and a pair of conductor tightening pieces extending from both side edges of the bottom plate in a direction intersecting an extending direction of the conductor, the conductor crimping portion configured to be crimped and connected to the conductor of the electric wire by tightening the conductor disposed on the bottom plate in a state where the conductor is covered with the conductor tightening pieces, wherein the conductor crimping portion includes a serration formed on a surface of the conductor crimping portion on a side in contact with the conductor, the serration extending in a groove shape across the pair of conductor tightening pieces and the bottom plate in a direction intersecting the extending direction of the conductor to be disposed on the bottom plate, and the serration is designed, in a flat plate-like developed state of the conductor crimping portion before being crimped to the conductor, such that a width of an opening of the serration in the extending direction is equal to or larger than a width of a bottom surface of the serration in the extending direction, and an angle of a side surface with respect to a normal of the bottom surface at a position of at least a part of a portion located in the conductor tightening piece is larger than an angle of the side surface with respect to the normal of the bottom surface at a portion located in the bottom plate.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments according to the present invention will be described below in detail with reference to the drawings. Note that the present invention is not limited by the present embodiment. Moreover, components in the following embodiment include those easily interchangeable by those skilled in the art or substantially identical.

Embodiment

Figure 1:
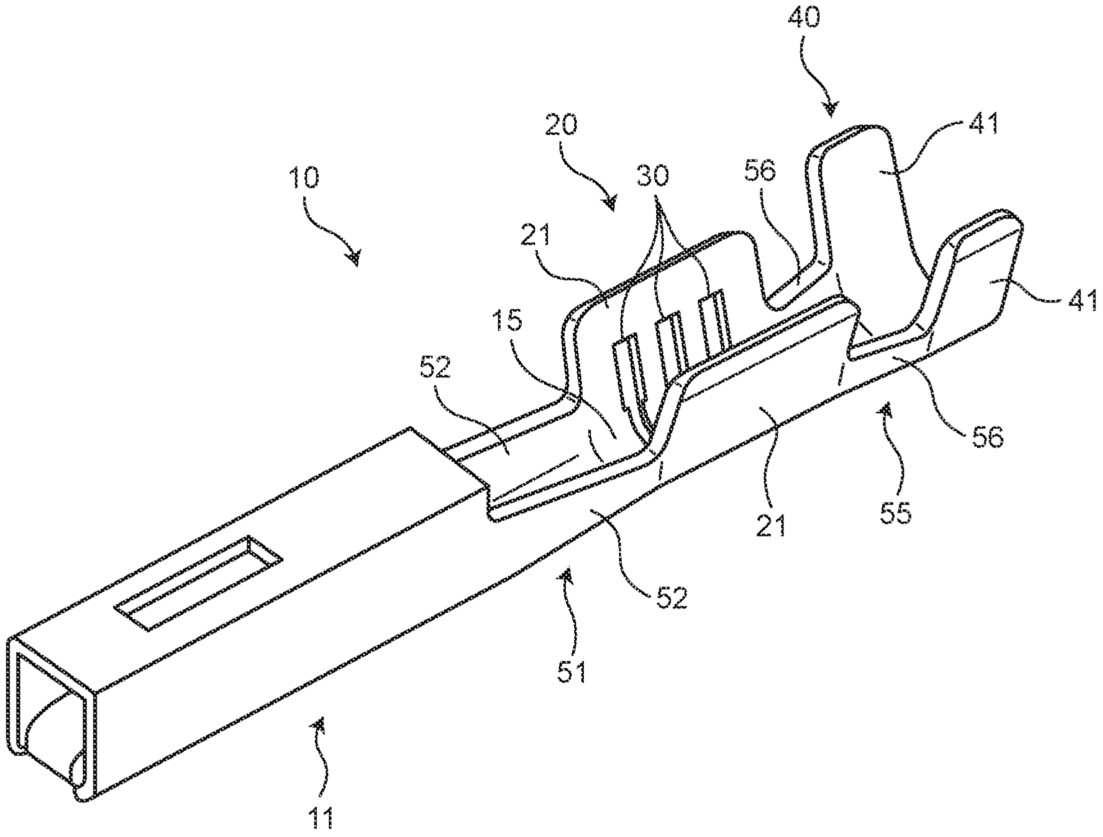
FIG. 1 is a perspective view of a crimping terminal according to an embodiment.

FIG. 1 is a perspective view of a crimping terminal 10 according to an embodiment. The crimping terminal 10 according to the embodiment is a member formed of a metal material, and includes an electrical connection portion 11, a conductor crimping portion 20, and a sheath tightening portion 40 from one end side to the other end side in the longitudinal direction of the crimping terminal 10 or in the longitudinal direction of the conductor of the electric wire to which the crimping terminal 10 is to be crimped. In addition, there is provided, between the electrical connection portion 11 and the conductor crimping portion 20, a first link portion 51 linking the electrical connection portion 11 and the conductor crimping portion 20 to each other, while there is provided, between the conductor crimping portion 20 and the sheath tightening portion 40, a second link portion 55 linking the conductor crimping portion 20 and the sheath tightening portion 40 to each other.

Among these, the electrical connection portion 11 is a site connected to a mating connector-side terminal to be connected to the crimping terminal 10. The conductor crimping portion 20 is a site crimped to the conductor of the electric wire to which the crimping terminal 10 is to be crimped, and the sheath tightening portion 40 is a site tightened to a portion of the electric wire to which the crimping terminal 10 is to be crimped where the conductor is covered with an insulating sheath.

Specifically, the conductor crimping portion 20 includes a bottom plate 15 and a conductor tightening piece 21. The bottom plate 15 is a plate-like member formed in a range from the first link portion 51 to the sheath tightening portion 40. On the bottom plate 15 at the position of the conductor crimping portion 20, there is provided a conductor Wa (refer to FIG. 5) of an electric wire W to which the crimping terminal 10 is to be crimped. In addition, the conductor tightening piece 21 extends, in a pair, from both side edges of the bottom plate 15 in a direction intersecting an extending direction of the conductor Wa of the electric wire W.

That is, the conductor tightening piece 21 is disposed to extend from each of both sides of the bottom plate 15 in a width direction of the bottom plate 15. For example, the conductor tightening piece 21 is formed such that, as illustrated in FIG. 1, both the conductor tightening pieces 21 are bent from the bottom plate 15 to the side where the electric wire W is disposed with respect to the bottom plate 15 in the thickness direction of the bottom plate 15, and both the bottom plate 15 and the conductor tightening piece 21 are formed in a substantially U shape when viewed in the extending direction of the electric wire W in the state of FIG. 1 before being crimped to the electric wire W.

In addition, on the surface of the conductor crimping portion 20 on the side in contact with the conductor Wa of the electric wire W, there is provided a serration 30 extending in a groove shape across the pair of conductor tightening pieces 21 and the bottom plate 15 so as to be formed in the direction intersecting the extending direction of the conductor Wa disposed on the bottom plate 15. That is, the serration 30 is formed on the inner surface side in the direction in which the conductor tightening piece 21 is bent with respect to the bottom plate 15. The serration 30 formed in the groove shape is arranged in plurality side by side in the extending direction of the electric wire W to be crimped by the conductor crimping portion 20. In the present embodiment, three serrations 30 are arranged side by side in the extending direction of the electric wire W to be crimped by the conductor crimping portion 20.

The sheath tightening portion 40 includes the bottom plate 15 and a sheath tightening piece 41. In the bottom plate 15 at the position of the sheath tightening portion 40, there is disposed a portion of the electric wire W to which the crimping terminal 10 is to be crimped, which is covered with an insulating sheath Wc (refer to FIG. 5). In addition, the sheath tightening piece 41 extends, in a pair, from both side edges of the bottom plate 15 in a direction intersecting the extending direction of the electric wire W.

That is, the sheath tightening piece 41 extends from each of both sides of the bottom plate 15 in the width direction of the bottom plate 15. The sheath tightening piece 41 is formed such that, as illustrated in FIG. 1, both the sheath tightening pieces 41 are bent from the bottom plate 15 to the side where the electric wire W is disposed with respect to the bottom plate 15 in the thickness direction of the bottom plate 15, and both the bottom plate 15 and the sheath tightening piece 41 are formed in a substantially U shape when viewed in the extending direction of the electric wire W in the state of FIG. 1 before being crimped to the electric wire W. That is, the sheath tightening piece 41 is bent in the same direction as the direction in which the conductor tightening piece 21 of the conductor crimping portion 20 is bent with respect to the bottom plate 15 in the thickness direction of the bottom plate 15.

In addition, the first link portion 51 includes the bottom plate 15 and a side plate 52. The side plate 52 extends, in a pair, from both side edges of the bottom plate 15 in the direction intersecting the extending direction of the electric wire W. In addition, the second link portion 55 includes the bottom plate 15 and a side plate 56. The side plate 56 extends, in a pair, from both side edges of the bottom plate 15 in the direction intersecting the extending direction of the electric wire W.

Similarly to the conductor tightening piece 21 of the conductor crimping portion 20 and the sheath tightening piece 41 of the sheath tightening portion 40, the side plate 52 of the first link portion 51 and the side plate 56 of the second link portion 55 are bent in the same direction as the conductor tightening piece 21 and the sheath tightening piece 41 with respect to the bottom plate 15. In addition, the side plate 52 of the first link portion 51 links the electrical connection portion 11 and the conductor tightening piece 21 to each other, while the side plate 56 of the second link portion 55 links the conductor tightening piece 21 and the sheath tightening piece 41 to each other.

Figure 2:
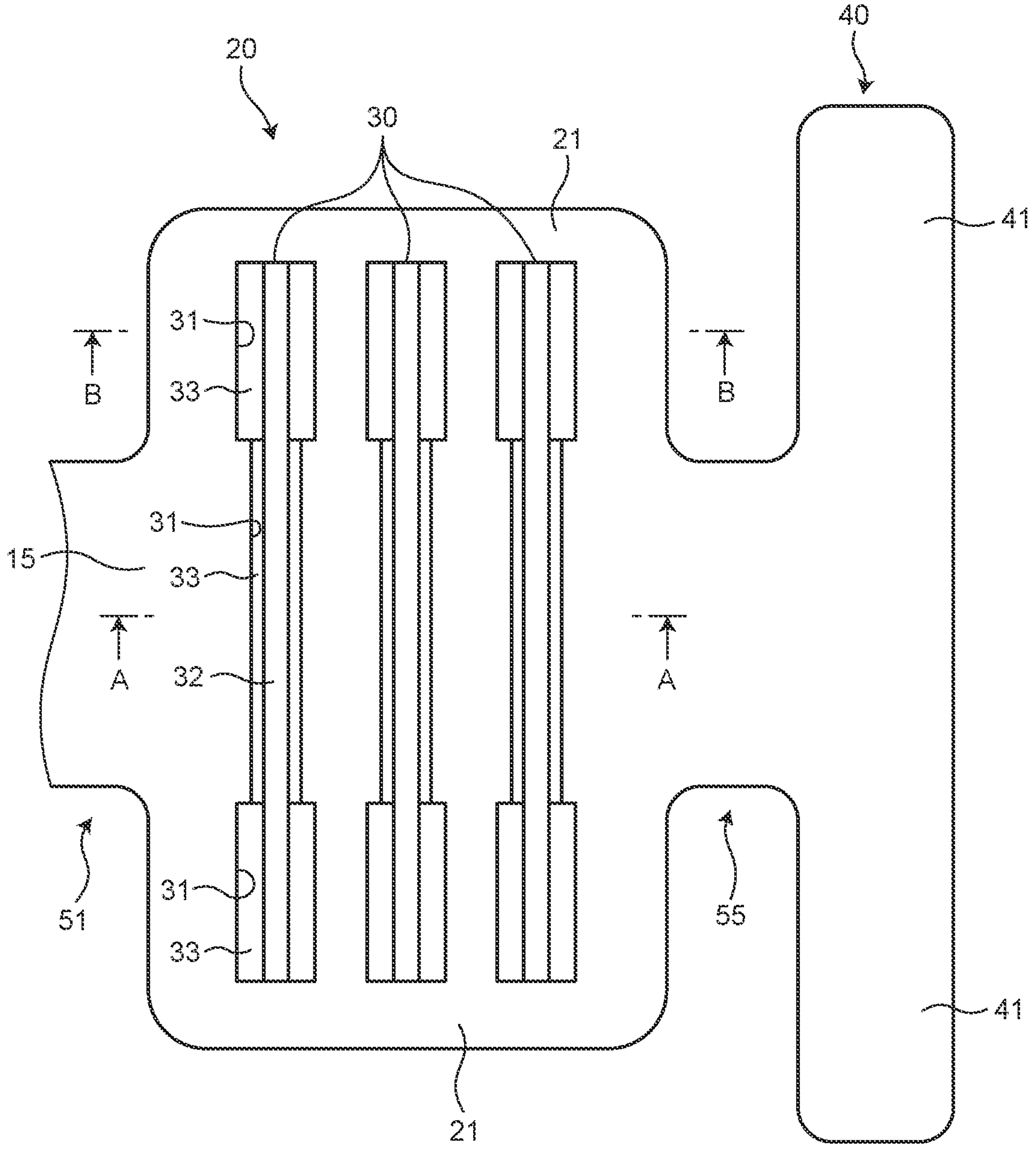
FIG. 2 is a view of a developed state of a conductor crimping portion illustrated in FIG. 1.

FIG. 2 is a view of a developed state of the conductor crimping portion 20 illustrated in FIG. 1. The serrations 30 formed in the conductor crimping portion 20 are formed across the bottom plate 15 from one conductor tightening piece 21 toward the other conductor tightening piece 21 of the pair of conductor tightening pieces 21 included in the conductor crimping portion 20 in a flat plate-like developed state of the conductor crimping portion 20 before being crimped to the conductor Wa (refer to FIG. 5) of the electric wire W. That is, the serrations 30 are formed in the direction intersecting the extending direction of the conductors Wa disposed on the bottom plate 15.

Specifically, in the present embodiment, the serrations 30 are formed in a direction substantially orthogonal to the extending direction of the conductors Wa disposed on the bottom plate 15. In other words, the serrations 30 are formed such that the extending direction of the conductors Wa disposed on the bottom plate 15 is the width direction of the groove which is the shape of the serration 30.

Figure 3:
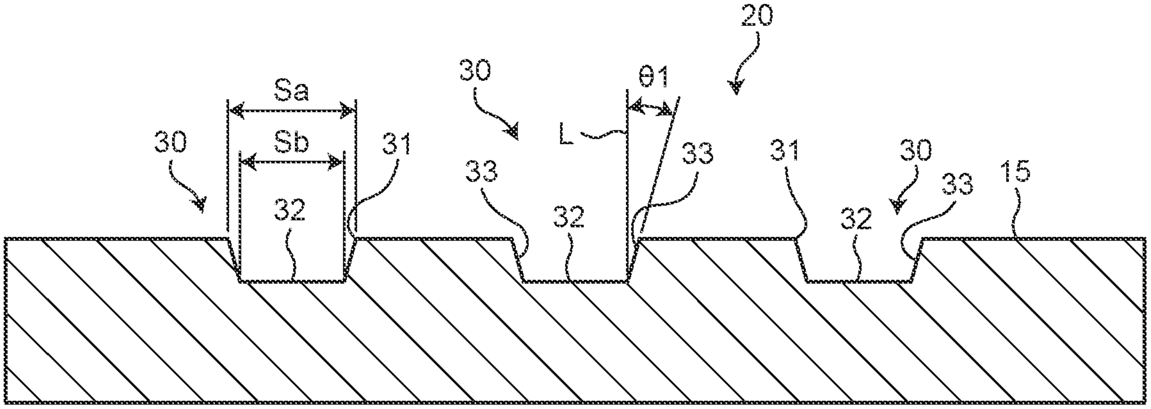
FIG. 3 is a cross-sectional view taken along line A-A of FIG. 2.
Figure 4:
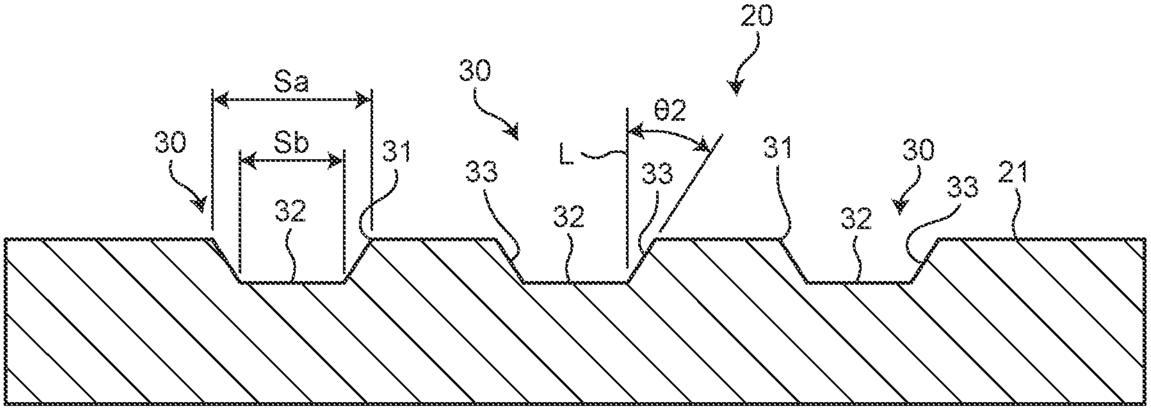
FIG. 4 is a cross-sectional view taken along line B-B of FIG. 2.

FIG. 3 is a cross-sectional view taken along line A-A of FIG. 2. FIG. 4 is a cross-sectional view taken along line B-B of FIG. 2. The serration 30 is formed in a groove shape having a bottom surface 32 and a side surface 33. The serration 30 opens at an opening 31 at a surface of the conductor crimping portion 20 on a side to which the conductor Wa is crimped. Furthermore, in the flat plate-like developed state of the conductor crimping portion 20 before being crimped to the conductor Wa, the serration 30 is designed such that a width Sa of the opening 31 of the serration 30 in the extending direction of the conductor Wa of the electric wire W is equal to or larger than a width Sb of the bottom surface 32 of the serration 30 in the extending direction of the conductor Wa of the electric wire W. That is, when the conductor crimping portion 20 is in the flat plate-like developed state, the serration 30 is designed such that the width Sa of the opening 31 is larger than the width Sb of the bottom surface 32 of the serration 30 at any position in the longitudinal direction of the serration 30.

In addition, in the flat plate-like developed state of the conductor crimping portion 20 before being crimped to the conductor Wa, the serration 30 is designed such that an angle θ2 of the side surface 33 with respect to a normal L of the bottom surface 32 at the position of at least a part of the portion located in the conductor tightening piece 21 is larger than an angle θ1 of the side surface 33 with respect to the normal L of the bottom surface 32 at the portion located in the bottom plate 15. That is, in the serrations 30, the angle θ2 of the side surface 33 with respect to a depth direction of the serration 30 at the position of at least a part of the portion located in the conductor tightening piece 21 is larger than the angle θ1 of the side surface 33 with respect to the depth direction of the serration 30 at the portion located in the bottom plate 15.

Specifically, the serration 30 is designed such that the bottom surface 32 has the width Sb being constant regardless of the position of the serration 30 in the longitudinal direction while the width Sa of the opening 31 varies depending on the position of the serration 30 in the longitudinal direction. That is, in the flat plate-like developed state of the conductor crimping portion 20, the serration 30 is designed such that the width Sb of the bottom surface 32 is constant, while the width Sa of the opening 31 at the position of at least a part of the portion located in the conductor tightening piece 21 is larger than the width Sa of the opening 31 at the portion located in the bottom plate 15. With this design of the serration 30, when the conductor crimping portion 20 is in the flat plate-like developed state, the angle θ2 of the side surface 33 at the position of at least a part of the portion located in the conductor tightening piece 21 is larger than the angle θ1 of the side surface 33 at the portion located in the bottom plate 15. The angles θ1 and θ2 of the side surface 33 of the serration 30 with respect to the normal L of the bottom surface 32 are preferably larger than 0° and 30° or less at any position.

In the present embodiment, the serrations 30 is designed such that the width Sa of the opening 31 varies in the vicinity of a joining portion of the conductor tightening piece 21 with the bottom plate 15 in the flat plate-like developed state of the conductor crimping portion 20, and the width Sa of the opening 31 in the portion located on the conductor tightening piece 21 side is larger than the width Sa of the opening 31 in the portion located on the bottom plate 15 side. This leads to the configuration of the serration 30 in which the width Sa of the opening 31 of almost all portions of the serration 30 located in the conductor tightening piece 21 is larger than the width Sa of the opening 31 of the portion located in the bottom plate 15. With this design, in the flat plate-like developed state of the conductor tightening piece 21, the serrations 30 is designed such that the angle θ2 of the side surface 33 with respect to the normal L of the bottom surface 32 of almost all portions located in the conductor crimping portion 20 is larger than the angle θ1 of the side surface 33 with respect to the normal L of the bottom surface 32 of the portion located in the bottom plate 15.

Although the above description regarding the form of the serrations 30 has a description of the serrations 30 when the conductor crimping portion 20 is in the flat plate-like developed state, the bottom plate 15 and the pair of conductor tightening pieces 21 are handled in a substantially U-shape in the crimping terminal 10 alone, as illustrated in FIG. 1. Similarly, the sheath tightening portion 40 is handled in a state where the bottom plate 15 and the pair of sheath tightening pieces 41 form a substantially U shape in the crimping terminal 10 alone, as illustrated in FIG. 1.

Figure 5:
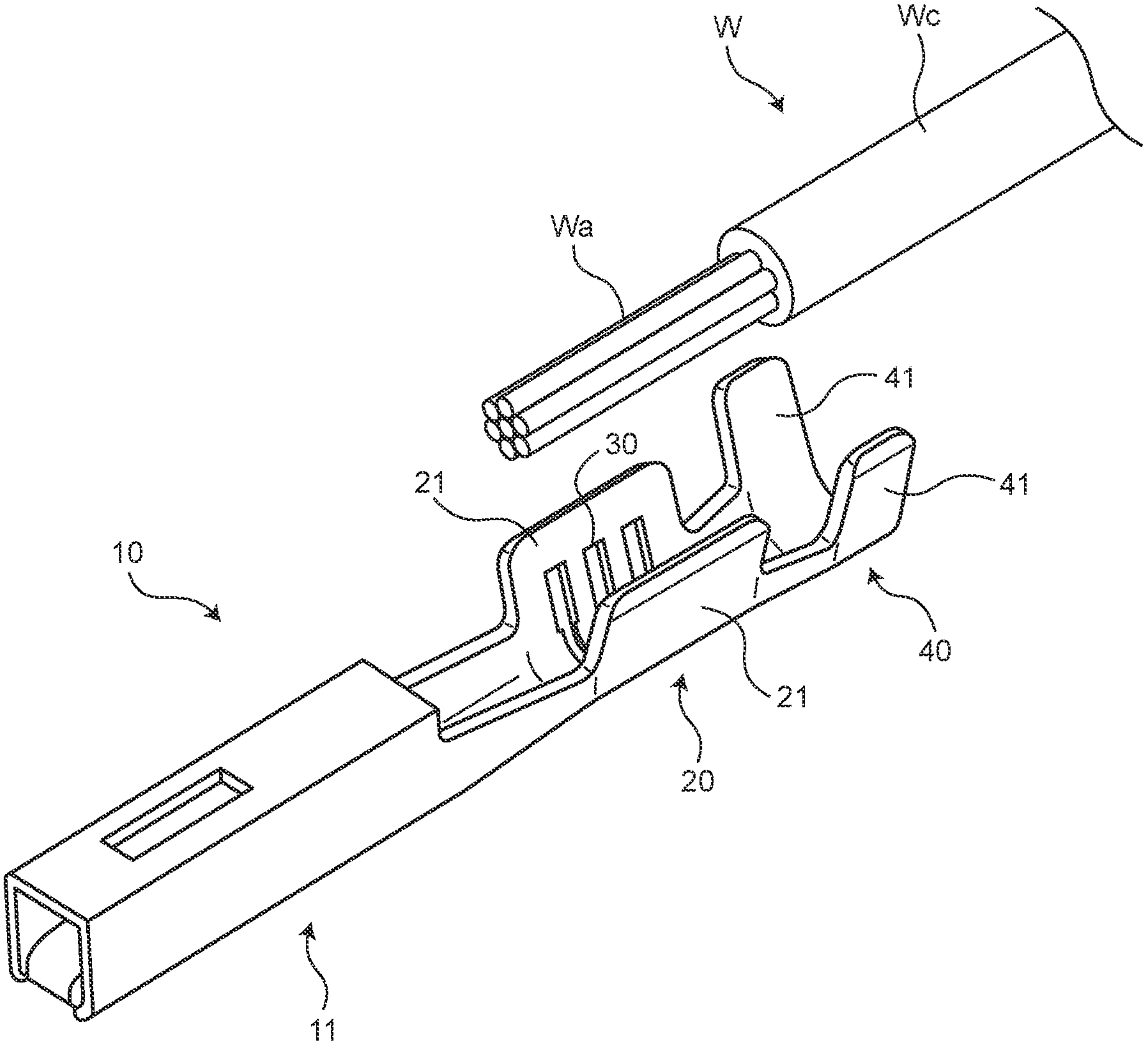
FIG. 5 is a view illustrating a state before a crimping terminal is crimped to an electric wire.

The crimping terminal 10 according to the present embodiment includes the above-described configurations. Next, the operation of the crimping terminal 10 will be described. FIG. 5 is a view illustrating a state before the crimping terminal 10 is crimped to the electric wire W. The crimping terminal 10 according to the present embodiment is crimped to the electric wire W in which the conductor Wa formed of metal wire is covered with the insulating sheath Wc. The procedure used when crimping the crimping terminal 10 to the electric wire W includes: removal of the insulating sheath We located in the vicinity of the end of the electric wire W; and insertion of the electric wire W between the pair of conductor tightening pieces 21 and the pair of sheath tightening pieces 41 of the crimping terminal 10 in a state where the conductor Wa is exposed in the vicinity of the end of the electric wire W. When the electric wire W is to be inserted between the conductor tightening piece 21 and the sheath tightening piece 41 of the crimping terminal 10, for example, the electric wire W is inserted in a state where the crimping terminal 10 is placed on a lower mold (anvil) (not illustrated) used when the crimping terminal 10 is crimped to the electric wire W.

At that time, insertion of the electric wire W is specifically performed so as to allow the exposed conductor Wa to enter between the pair of conductor tightening pieces 21 and allow a portion where the conductor Wa is covered with the insulating sheath Wc to enter between the pair of sheath tightening pieces 41. In other words, the electric wire W is disposed so as to set the exposed conductor Wa to be positioned in the conductor crimping portion 20 and set the portion where the conductor Wa is covered with the insulating sheath We to be positioned in the sheath tightening portion 40. With this procedure, the conductor Wa of the electric wire W is disposed on the bottom plate 15 of the conductor crimping portion 20 of the crimping terminal 10, while the portion where the conductor Wa is covered with the insulating sheath Wc is disposed on the bottom plate 15 of the sheath tightening portion 40 of the crimping terminal 10.

Figure 6:
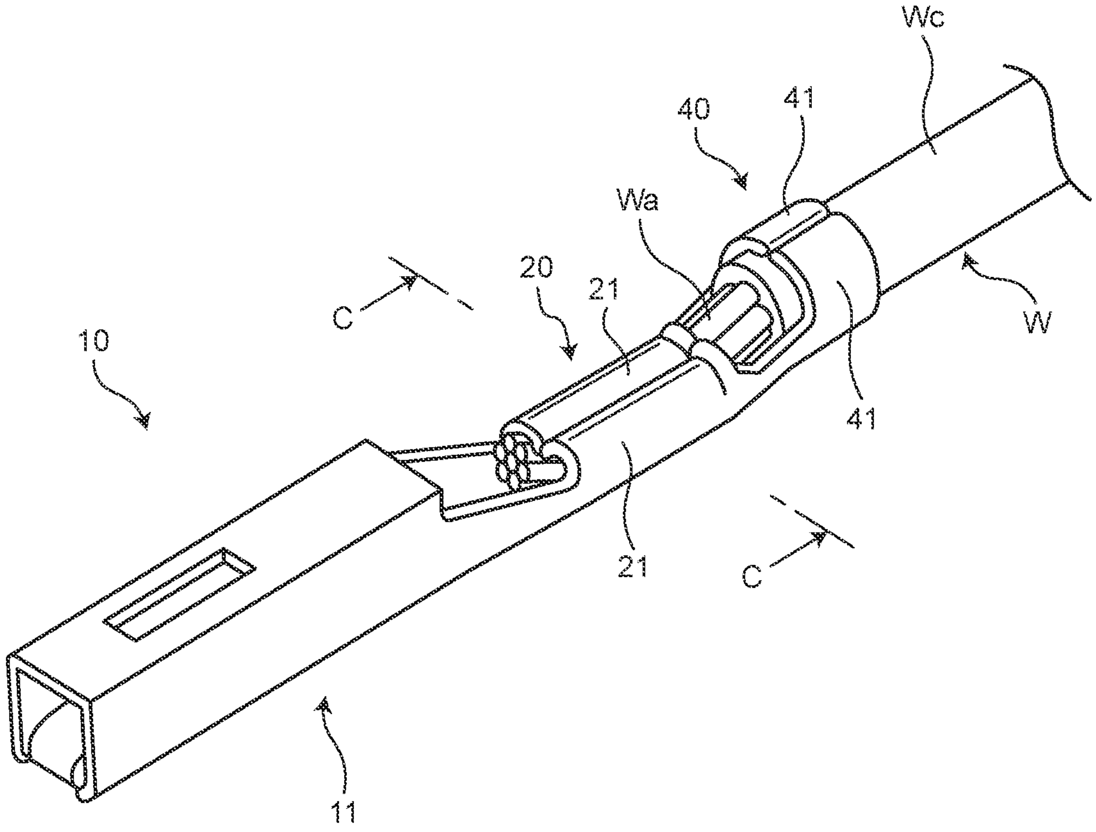
FIG. 6 is a view illustrating a state in which a crimping terminal is crimped to an electric wire.

FIG. 6 is a view illustrating a state in which the crimping terminal 10 is crimped to the electric wire W. When the electric wire W has been inserted between the conductor tightening pieces 21 and between the sheath tightening pieces 41 of the crimping terminal 10, the conductor tightening piece 21 and the sheath tightening piece 41 are tightened. When tightening the conductor tightening piece 21 and the sheath tightening piece 41 of the crimping terminal 10, an upper mold (crimper) (not illustrated) used at crimping the crimping terminal 10 to the electric wire W is lowered from above the crimping terminal 10 toward the crimping terminal 10. With this operation, the crimping terminal 10 having the electric wire W disposed on the bottom plate 15 is sandwiched between the upper mold and the lower mold, and the conductor tightening piece 21 and the sheath tightening piece 41 are rounded so as to be folded back toward the side on which the electric wire W is disposed, by a guide surface formed on the surface of the upper mold on the side facing the crimping terminal 10.

By being rounded so as to be folded back to the side where the electric wire W is disposed in this manner, the pair of conductor tightening pieces 21 is tightened onto the conductor Wa in a state of covering the conductor Wa of the electric wire W disposed on the bottom plate 15. By covering and tightening the conductor Wa of the electric wire W disposed on the bottom plate 15 with the conductor tightening piece 21, the conductor crimping portion 20 including the conductor tightening piece 21 is crimped and connected to the conductor Wa of the electric wire W.

Similarly, each of the pair of sheath tightening pieces 41 is rounded so as to be folded back to the side on which the electric wire W is disposed, whereby the pair of sheath tightening pieces 41 is tightened onto the electric wire W in a state of covering a portion of the electric wire W disposed on the bottom plate 15 where the conductor Wa is covered with the insulating sheath Wc. By covering and tightening the electric wire W disposed on the bottom plate 15 with the sheath tightening piece 41, the sheath tightening portion 40 including the sheath tightening piece 41 is crimped and connected to the electric wire W.

With these procedures, the crimping terminal 10 is crimped and connected to the electric wire W in a state where the surface of the conductor tightening piece 21 and the bottom plate 15 of the conductor crimping portion 20 on the side where the serrations 30 are formed is in contact with the conductor Wa of the electric wire W.

Figure 7:
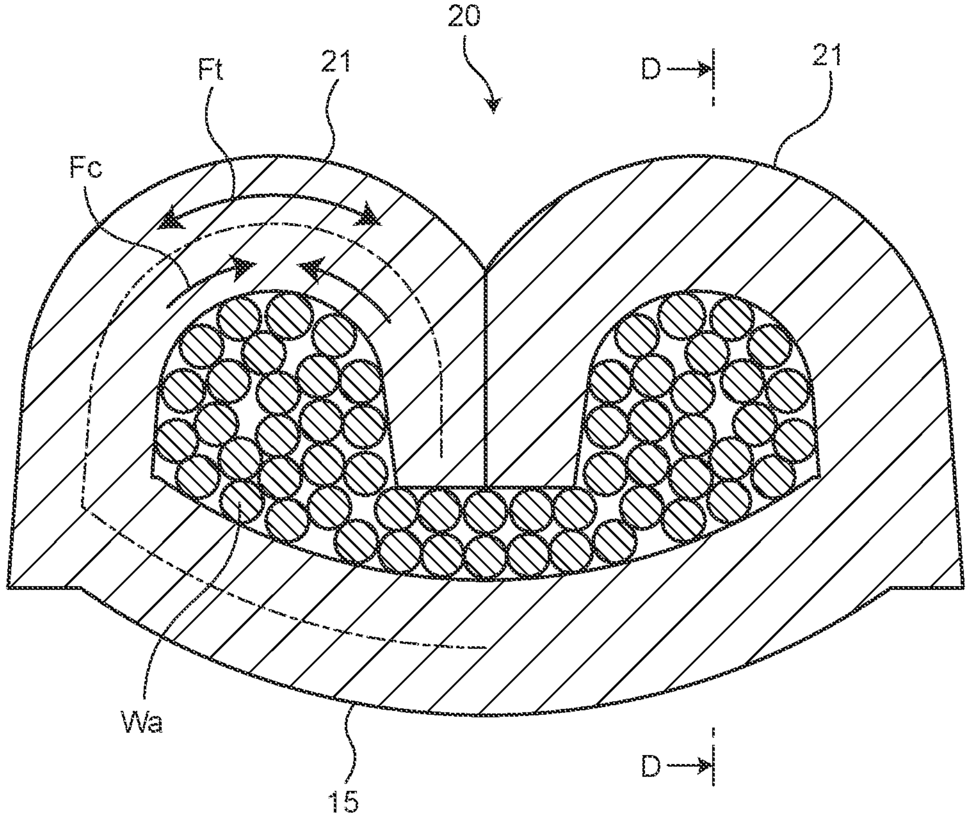
FIG. 7 is a cross-sectional view taken along line C-C of FIG. 6.

FIG. 7 is a cross-sectional view taken along line C-C of FIG. 6. In a state where the conductor crimping portion 20 is crimped to the conductor Wa of the electric wire W, when the conductor crimping portion 20 is viewed in the extending direction of the conductor Wa, the pair of conductor tightening pieces 21 is greatly bent in a direction in which the pair of conductor tightening pieces 21 protrudes and curves to the opposite side of the side in contact with the conductor Wa. In contrast, as compared with the conductor tightening piece 21, the shape of the bottom plate 15 does not change greatly before and after the conductor crimping portion 20 is crimped to the conductor Wa, and the bottom plate 15 is gently curved in a direction protruding to the opposite side of the side in contact with the conductor Wa when the conductor crimping portion 20 is viewed in the extending direction of the conductor Wa.

Therefore, the conductor tightening piece 21 has a state after the conductor crimping portion 20 is crimped to the conductor Wa, in which the radius of curvature when the conductor crimping portion 20 is viewed in the extending direction of the conductor Wa is smaller than the radius of curvature of the bottom plate 15. In other words, in the conductor tightening piece 21, the curvature when the conductor crimping portion 20 is viewed in the extending direction of the conductor Wa is larger than the curvature of the bottom plate 15 in the state after the conductor crimping portion 20 is crimped to the conductor Wa.

The serration 30 is formed in the conductor crimping portion 20 having the conductor tightening piece 21 that is greatly bent in this manner at the time of crimping to the conductor Wa. In a flat plate-like developed state of the conductor crimping portion 20, the serration 30 is designed such that the angle θ2 (refer to FIG. 4) of the side surface 33 of almost all portions located in the conductor tightening piece 21 is larger than the angle θ1 (refer to FIG. 3) of the side surface 33 of a portion located in the bottom plate 15. For this reason, in the conductor tightening piece 21 in which the serrations 30 are formed, the angle θ2 of the side surface 33 of the serration 30 in the developed state of the conductor crimping portion 20 in a portion where the radius of curvature of the conductor tightening piece 21 is the smallest when viewed in the extending direction of the conductor Wa in the state after the conductor crimping portion 20 is crimped to the conductor Wa is larger than the angle θ1 of the side surface 33 of the portion located in the bottom plate 15.

Here, when the plate-shaped member is bent in the thickness direction of the plate, a tensile force acts on the outer side in the bending direction, and a compressive force acts on the inner side in the bending direction. Therefore, when the conductor crimping portion 20 is crimped to the conductor Wa by greatly bending the conductor tightening piece 21 and tightening the conductor tightening piece 21 onto the conductor Wa of the electric wire W, forces are applied to the conductor tightening piece 21 such that a tensile force Ft acts on the outer side in the bending direction while a compressive force Fc acts on the inner side in the bending direction. That is, forces are applied to the conductor tightening piece 21 tightened onto the conductor Wa such that the tensile force Ft acts on the conductor tightening piece 21 at a position closer to the surface on the opposite side of the side on which the conductor Wa is located in the thickness direction of the conductor tightening piece 21, while the compressive force Fc acts on the conductor tightening piece 21 at a position closer to the surface on the side on which the conductor Wa is located.

Figure 8:
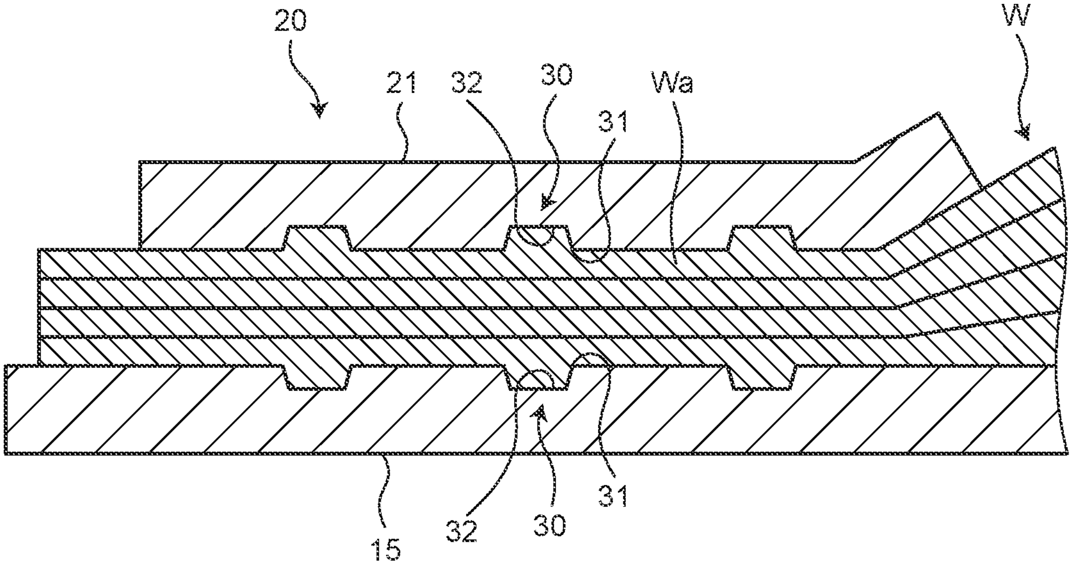
FIG. 8 is a cross-sectional view taken along line D-D of FIG. 7.

FIG. 8 is a cross-sectional view taken along line D-D of FIG. 7. The serrations 30 are formed on the surface of the conductor tightening piece 21 on the side in contact with the conductor Wa. When the conductor tightening piece 21 is greatly bent and this causes the compressive force Fc to act on the portion on the side where the conductor Wa is located in the thickness direction of the conductor tightening piece 21, the serrations 30 are easily compressed by the compressive force Fc. In this case, the portion of the serrations 30 located in the conductor tightening piece 21 is compressed by the compressive force Fc, for example, in a direction in which the width of the opening 31 is narrowed. With this configuration, the portion of the serrations 30 located in the conductor tightening piece 21 is deformed in a direction in which the width of the opening 31 is narrowed.

When the conductor tightening piece 21 is tightened, the portion of the serration 30 located in the conductor tightening piece 21 is deformed in a direction in which the width of the opening 31 is narrowed. At this time, in the flat plate-like developed state of the conductor crimping portion 20, the serration 30 is in a state where the angle θ2 of the side surface 33 at the position of at least a part of the portion located in the conductor tightening piece 21 is larger than the angle θ1 of the side surface 33 at the portion located in the bottom plate 15.

That is, in the portion of the serrations 30 located in the conductor tightening piece 21, the degree of increase in the width Sa of the opening 31 with respect to the width Sb of the bottom surface 32 is relatively larger than the degree in the portion located in the bottom plate 15. Because of this design, even when the portion of the serration 30 located in the conductor tightening piece 21 is deformed in the direction in which the width of the opening 31 is narrowed due to a large degree of bending of the conductor tightening piece 21, the width of the opening 31 is less likely to be smaller than the width of the bottom surface 32, making it possible to maintain the state in which the width of the opening 31 is larger than the width of the bottom surface 32.

On the other hand, regarding the portion of the bottom plate 15 located at the conductor crimping portion 20, the bottom plate 15 is not greatly deformed even when the conductor tightening piece 21 is tightened. With this configuration, even when the conductor tightening piece 21 is tightened to crimp the conductor crimping portion 20 to the conductor Wa of the electric wire W, the portion of the serration 30 located on the bottom plate 15 maintains a state where the width of the opening 31 is larger than the width of the bottom surface 32, similarly to the flat plate-like developed state of the conductor crimping portion 20.

When the conductor tightening piece 21 is tightened to crimp the conductor crimping portion 20 to the conductor Wa of the electric wire W, a large load acts on the conductor Wa from the conductor crimping portion 20. That is, when the conductor crimping portion 20 is crimped to the conductor Wa of the electric wire W, a large load acts on the conductor Wa from the conductor crimping portion 20 by the force applied to the crimping terminal 10 from the upper mold and the lower mold in order to crimp the conductor crimping portion 20 to the conductor Wa. With this action, the conductor Wa comes in close contact with the conductor crimping portion 20, and a portion located on the serration 30 enters the serration 30.

At this time, even after the conductor tightening piece 21 is tightened, the serration 30 maintains a shape in which the width of the opening 31 of the serration 30 is larger than the width of the bottom surface 32, and the width increases from the bottom surface 32 toward the opening 31. In particular, in the portion of the serration 30 formed in the conductor tightening piece 21, since the conductor tightening piece 21 is greatly bent when the conductor tightening piece 21 is tightened, the width of the serration 30 on the opening 31 side tends to be narrowed. In the present embodiment, however, the serration 30 maintains a state in which the width on the opening 31 side is larger than the width on the bottom surface 32 side, even after the conductor tightening piece 21 is tightened.

Figure 9:
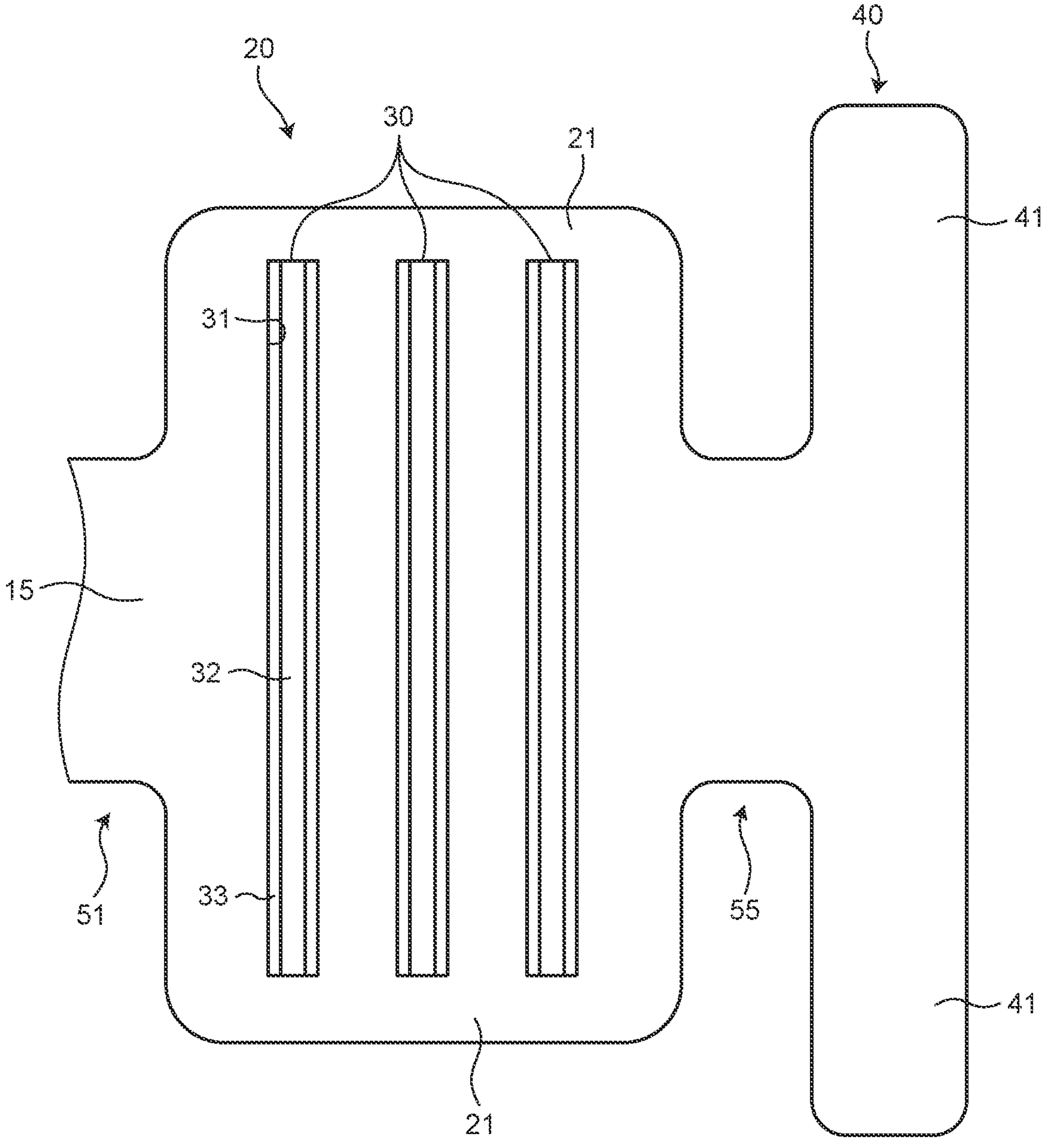
FIG. 9 is a view in a case where an inclination angle of a side surface of a serration is formed at the same angle at a position of a bottom plate and at a position of a conductor tightening piece in a flat plate-like developed state of the conductor crimping portion.
Figure 10:
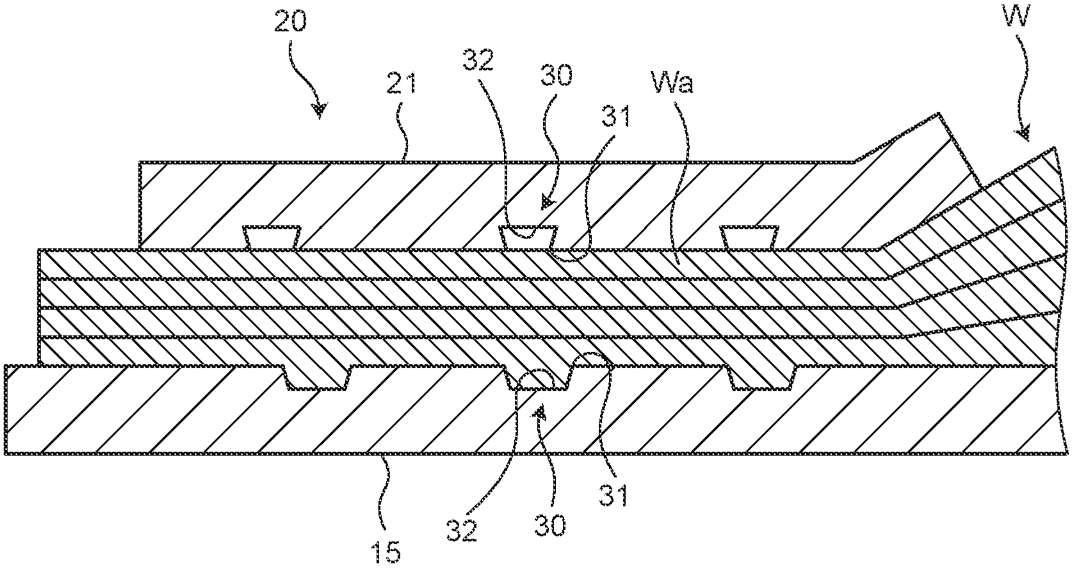
FIG. 10 is a view illustrating a state where a conductor tightening piece of the conductor crimping portion illustrated in FIG. 9 is tightened to be crimped to the conductor.

FIG. 9 is a view in a case where the inclination angle of the side surface 33 of the serration 30 is formed at the same angle between the position of the bottom plate 15 and the position of the conductor tightening piece 21 in the flat plate-like developed state of the conductor crimping portion 20. FIG. 10 is a view illustrating a state in which the conductor tightening piece 21 of the conductor crimping portion 20 illustrated in FIG. 9 is tightened to be crimped to the conductor Wa. In a case where the serration 30 formed in the conductor crimping portion 20 is designed, as illustrated in FIG. 9, such that the width of the serration 30 is constant between the portion located in the conductor tightening piece 21 and the portion located in the bottom plate 15 in the flat plate-like developed state of the conductor crimping portion 20, the conductor Wa would have a difficulty in entering the portion located in the conductor tightening piece 21 in the serration 30 when the conductor tightening piece 21 is tightened.

That is, in the case where the width of the opening 31 of the serration 30 and the width of the bottom surface 32 are constant between the portion of the serration 30 located in the conductor tightening piece 21 and the portion located in the bottom plate 15, the angle of the side surface 33 of the portion of the serrations 30 located in the conductor tightening piece 21 would be the same as the angle of the side surface 33 of the portion located in the bottom plate 15. In this case, when the conductor tightening piece 21 is greatly bent and tightened, the portion of the serration 30 located in the conductor tightening piece 21 is deformed in a direction in which the width on the opening 31 side is narrowed as illustrated in FIG. 10 by the compressive force generated inside in the bending direction when the conductor tightening piece 21 is greatly bent. Therefore, when the conductor crimping portion 20 is crimped to the conductor Wa by tightening the conductor tightening piece 21, the conductor Wa would have a difficulty in entering the portion of the serration 30 located at the conductor tightening piece 21 where the width of the opening 31 is narrowed.

By comparison, the serration 30 in the present embodiment is designed such that the angle θ2 of the side surface 33 of the portion located in the conductor tightening piece 21 is larger than the angle θ1 of the side surface 33 of the portion located in the bottom plate 15 in the flat plate-like developed state of the conductor crimping portion 20. Therefore, even when a compressive force acts by greatly bending the conductor tightening piece 21, the width of the opening 31 of the portion located in the conductor tightening piece 21 is less likely to be narrowed. Therefore, when the conductor crimping portion 20 is crimped to the conductor Wa, a portion of the conductor Wa adjacent to the conductor tightening piece 21 easily enters a portion of the serration 30 located at the conductor tightening piece 21 due to a load acting on the conductor Wa from the conductor crimping portion 20 at the time of crimping. In the portion of the conductor Wa adjacent to the conductor tightening piece 21 and the conductor tightening piece 21, since the conductor Wa enters the serration 30 in this manner, it is possible to increase the contact area between the conductor Wa and the conductor tightening piece 21. This decreases the crimping portion resistance, which is the electrical resistance at the crimping portion between the conductor Wa and the crimping terminal 10.

In addition, even when the conductor crimping portion 20 is crimped to the conductor Wa, the shape of the portion of the conductor crimping portion 20 on the bottom plate 15 side is less likely to change from the state before crimping, and the shape of the portion of the serrations 30 located on the bottom plate 15 is also less likely to change. With this configuration, even when the conductor crimping portion 20 is crimped to the conductor Wa, the portion of the serration 30 located on the bottom plate 15 can maintain a state where the width on the opening 31 side is larger than the width on the bottom surface 32 side. Accordingly, the portion of the conductor Wa adjacent to the bottom plate 15 easily enters the portion of the serrations 30 located on the bottom plate 15 due to the load acting on the conductor Wa from the conductor crimping portion 20 at the time of crimping. This increases the contact area between the portion of the conductor Wa adjacent to the bottom plate 15 and the bottom plate 15, leading to the reduction of the crimping portion resistance.

The crimping terminal 10 according to the above embodiment include the serration 30 being formed in the conductor crimping portion 20 and being designed such that the angle θ2 of the side surface 33 at the position of at least a part of the portion located in the conductor tightening piece 21 is larger than the angle θ1 of the side surface 33 of the portion located in the bottom plate 15 in a flat plate-like developed state of the conductor crimping portion 20. Therefore, even when the conductor crimping portion 20 is crimped to the conductor Wa by tightening the conductor tightening piece 21, it is possible to suppress the width of the opening 31 of the portion of the serration 30 located at the conductor tightening piece 21 from becoming smaller than the width of the bottom surface 32 of the serration 30 due to the compressive force at bending the conductor tightening piece 21.

With this configuration, even in a situation where the width of the opening 31 of the portion of the serrations 30 located at the conductor tightening piece 21 is likely to be narrowed by greatly bending and tightening the conductor tightening piece 21, it is possible to allow the portion of the conductor Wa adjacent to the conductor tightening piece 21 to easily enter the serration 30. Therefore, when the conductor tightening piece 21 is tightened to crimp the conductor crimping portion 20 to the conductor Wa, entrance of the conductor Wa to the serration 30 can increase the contact area between the conductor Wa and the crimping terminal 10, making it possible to achieve reduction of the electrical resistance between the conductor Wa and the crimping terminal 10. As a result, the crimping portion resistance can be stably reduced.

In addition, when the conductor tightening piece 21 is tightened to crimp the conductor crimping portion 20 to the conductor Wa, the conductor Wa easily enters the serration 30 at any position on the conductor tightening piece 21 side and the bottom plate 15 side, making it possible to restrict the relative movement between the conductor Wa and the conductor crimping portion 20. As a result, it is possible to strengthen the mechanical connection force between the conductor Wa and the conductor crimping portion 20.

In addition, since the angles θ1 and θ2 of the side surface 33 of the serration 30 with respect to the normal L of the bottom surface 32 are larger than 0° and 30° or less, making it possible to ensure the mechanical connection force between the conductor Wa and the conductor crimping portion 20. That is, in a case where the angles θ1 and θ2 of the side surface 33 with respect to the normal L of the bottom surface 32 of the serration 30 are larger than 30°, there is a possibility of decreasing the adhesion amount with the conductor Wa of the electric wire W due to the edge of the opening 31 of the serrations 30, leading to a possibility of having difficulty in ensuring the connection force by the serration 30. By comparison, when the angles θ1 and θ2 of the side surface 33 with respect to the normal L of the bottom surface 32 of the serration 30 are 30° or less, it is possible to ensure the adhesion amount with the conductor Wa of the electric wire W by the edge of the opening 31 of the serration 30, making it possible to ensure the connection force by the serration 30. As a result, it is possible to strengthen the mechanical connection force between the conductor Wa and the conductor crimping portion 20.

Furthermore, the conductor tightening piece 21 has a state after the conductor crimping portion 20 is crimped to the conductor Wa, in which the radius of curvature when viewed in the extending direction of the conductor Wa is smaller than the radius of curvature of the bottom plate 15. Therefore, in the developed state of the conductor crimping portion 20, by forming the angle θ2 of the side surface 33 of the portion of the serrations 30 located on the conductor tightening piece 21 to be larger than the angle θ1 of the side surface 33 of the portion located on the bottom plate 15, it is possible to suppress the width of the opening 31 of the serrations 30 from becoming smaller than the width of the bottom surface 32 due to the compressive force at the time of bending even when the conductor tightening piece 21 is bent and tightened with a small radius of curvature. Therefore, when the conductor tightening piece 21 is tightened to crimp the conductor crimping portion 20 to the conductor Wa, it is possible to facilitate the entrance of the conductor Wa to the serration 30, making it possible to increase the contact area between the conductor Wa and the crimping terminal 10, achieving reduction of the electrical resistance between the conductor Wa and the crimping terminal 10. As a result, the crimping portion resistance can be stably reduced.

In addition, in the conductor tightening piece 21, the angle θ2 of the side surface 33 of the serration 30 in the developed state of the conductor crimping portion 20 at the portion where the radius of curvature is the smallest in the state after the conductor crimping portion 20 is crimped to the conductor Wa is larger than the angle θ1 of the side surface 33 at the portion located on the bottom plate 15. Therefore, when the conductor tightening piece 21 is bent and tightened with a small radius of curvature, it is possible to suppress the width of the opening 31 of the serration 30 from becoming smaller than the width of the bottom surface 32 due to the compressive force. With this configuration, when the conductor tightening piece 21 is tightened to crimp the conductor crimping portion 20 to the conductor Wa, it is possible to facilitate the entrance of the conductor Wa to the serrations 30, making it possible to increase the contact area between the conductor Wa and the crimping terminal 10, achieving reduction of the electrical resistance between the conductor Wa and the crimping terminal 10. As a result, the crimping portion resistance can be stably reduced.

Modification

In the embodiment described above, the serration 30 formed in the conductor crimping portion 20 is designed such that the angle of the side surface 33 changes due to a sharp change in the width of the opening 31 at a predetermined position in the longitudinal direction of the serration 30 in the developed state of the conductor crimping portion 20. However, the width of the opening 31 may gradually change. That is, the side surface 33 of the bottom surface 32 of the serration 30 with respect to the normal L may gradually change together with change in the width of the opening 31.

Furthermore, in the embodiment described above, the serration 30 formed in the conductor crimping portion 20 has a configuration in which the angle θ2 (refer to FIG. 4) of the side surface 33 at the position of at least a part of the portion located in the conductor tightening piece 21 is larger than the angle θ1 (refer to FIG. 3) of the side surface 33 of the portion located in the bottom plate 15 due to the change in the width of the opening 31 depending on the position in the longitudinal direction of the serration 30 in the developed state of the conductor crimping portion 20. Alternatively, however, the angle of the side surface 33 of the serrations 30 may change in other modes.

Figure 11:
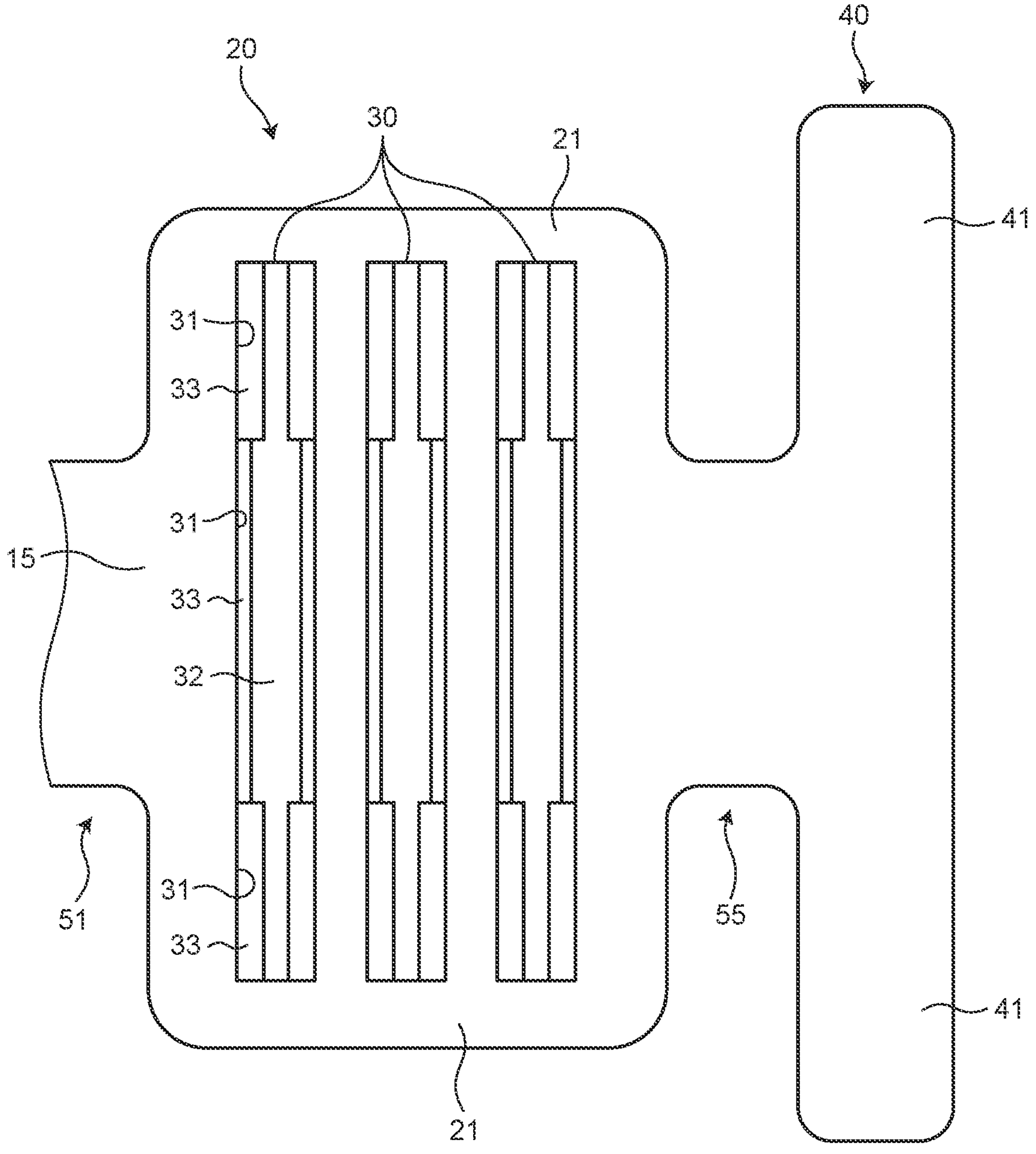
FIG. 11 is a view of a developed state of a conductor crimping portion according to a modification of the embodiment.

FIG. 11 is a view of a developed state of the conductor crimping portion 20 according to a modification of the embodiment. As illustrated in FIG. 11, for example, it is allowable to design the serration 30 such that the angle θ2 of the side surface 33 of the portion located in the conductor tightening piece 21 is larger than the angle θ1 of the side surface 33 of the portion located in the bottom plate 15 by changing the width of the bottom surface 32 for each of positions of the serration 30 in the longitudinal direction, while forming the width of the opening 31 to be constant.

In FIG. 11, in the flat plate-like developed state of the conductor crimping portion 20, the serration 30 is designed such that the width of the bottom surface 32 changes in the vicinity of the joining portion of the conductor tightening piece 21 with the bottom plate 15, and the width of the bottom surface 32 of the portion located on the conductor tightening piece 21 side is smaller than the width of the bottom surface 32 of the portion located on the bottom plate 15 side. Since the width of the opening 31 is constant, by changing the width of the bottom surface 32 in this manner, the angle θ2 of the side surface 33 is larger than the angle θ1 of the side surface 33 of the portion located on the bottom plate 15 side in the portion located on the conductor tightening piece 21 side, which is the portion where the width of the bottom surface 32 is relatively small in the serration 30. In this manner, as long as the angle θ2 of the side surface 33 of at least a part of the portion of the serration 30 located in the conductor tightening piece 21 is larger than the angle θ1 of the side surface 33 of the portion located in the bottom plate 15, any method can be used to achieve this mode.

Furthermore, the above-described embodiment is a case where the shape of the bottom plate 15 does not change greatly before and after the conductor crimping portion 20 is crimped to the conductor Wa of the electric wire W. Alternatively, however, when the bottom plate 15 is also bent as compared with the state before crimping when the conductor crimping portion 20 is crimped to the conductor Wa of the electric wire W, the angle of the side surface 33 may be changed even in the portion of the serration 30 formed on the bottom plate 15. For example, in a case where the bottom plate 15 is bent at a position in the vicinity of the center in the longitudinal direction of the serration 30 as compared with the state before crimping when the conductor crimping portion 20 is crimped to the conductor Wa, the angle of the side surface 33 of the serration 30 located in the vicinity of the portion where the bottom plate 15 is bent may be made larger than the angle of the side surface 33 located at the portion where the degree of the bending in the bottom plate 15 is small.

With this configuration, even when a part of the bottom plate 15 is bent when the conductor crimping portion 20 is crimped to the conductor Wa of the electric wire W, it is possible to suppress the width of the opening 31 of the serration 30 located at the bent portion of the bottom plate 15 from becoming smaller than the width of the bottom surface 32, making it possible to allow the conductor Wa to easily enter the serration 30 when the conductor crimping portion 20 is crimped to the conductor Wa. This makes it possible to increase the contact area between the conductor Wa and the crimping terminal 10 and reduce the electrical resistance between the conductor Wa and the crimping terminal 10, leading to a stable decrease in the crimping portion resistance.

Furthermore, although the above-described embodiment is an exemplary case where three serrations 30 are formed in the conductor crimping portion 20, the number of serrations 30 formed in the conductor crimping portion 20 may be two or less, or may be four or more.

Note that the crimping terminal according to the embodiment and the modification of the present invention described above is not limited to the embodiment and the modification described above, and various modifications can be made within the scope described in the claims. The crimping terminal according to the present embodiment and the modification may be configured by appropriately combining the components of the embodiment and the modification described above.

The crimping terminal according to the present embodiment includes a serration being formed in the conductor crimping portion and being designed such that the angle of the side surface at the position of at least a part of the portion located in the conductor tightening piece is larger than the angle of the side surface of the portion located in the bottom plate in a flat plate-like developed state of the conductor crimping portion. Therefore, even when the conductor crimping portion is crimped to the conductor by tightening the conductor tightening piece, it is possible to suppress the width of the opening of the portion of the serration located at the conductor tightening piece from becoming smaller than the width of the bottom surface of the serration. This facilitates entrance of a portion of the conductor adjacent to the conductor tightening piece into the serration, and when the conductor crimping portion is crimped to the conductor by tightening the conductor tightening piece, entrance of the conductor into the serration increases the contact area between the conductor and the crimping terminal, making it possible to achieve reduction of the electrical resistance. This effectively and stably reduces the crimping portion resistance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A crimping terminal comprising:

a conductor crimping portion that includes: a bottom plate on which a conductor of an electric wire is disposed; and a pair of conductor tightening pieces extending from both side edges of the bottom plate in a direction intersecting an extending direction of the conductor, the conductor crimping portion configured to be crimped and connected to the conductor of the electric wire by tightening the conductor disposed on the bottom plate in a state where the conductor is covered with the conductor tightening pieces, wherein the conductor crimping portion includes a serration formed on a surface of the conductor crimping portion on a side in contact with the conductor, the serration extending in a groove shape across the pair of conductor tightening pieces and the bottom plate in a direction intersecting the extending direction of the conductor to be disposed on the bottom plate, and the serration is designed, in a flat plate-like developed state of the conductor crimping portion before being crimped to the conductor, such that a width of an opening of the serration in the extending direction is equal to or larger than a width of a bottom surface of the serration in the extending direction, and an angle of a side surface with respect to a normal of the bottom surface at a position of at least a part of a portion located in the conductor tightening piece is larger than an angle of the side surface with respect to the normal of the bottom surface at a portion located in the bottom plate.

2. The crimping terminal according to claim 1, wherein in a state after the conductor crimping portion is crimped to the conductor, the conductor tightening piece is designed such that an angle of the side surface with respect to the normal of the bottom surface of a portion having a smallest radius of curvature when viewed in the extending direction of the conductor is larger than the angle of the side surface with respect to the normal of the bottom surface of a portion located on the bottom plate.

3. The crimping terminal according to claim 1, wherein in a state after the conductor crimping portion is crimped to the conductor, a radius of curvature of the conductor tightening piece when viewed in the extending direction of the conductor is smaller than a radius of curvature of the bottom plate.

4. The crimping terminal according to claim 3, wherein in a state after the conductor crimping portion is crimped to the conductor, the conductor tightening piece is designed such that an angle of the side surface with respect to the normal of the bottom surface of a portion having a smallest radius of curvature when viewed in the extending direction of the conductor is larger than the angle of the side surface with respect to the normal of the bottom surface of a portion located on the bottom plate.

* * * * *